Figure 1:
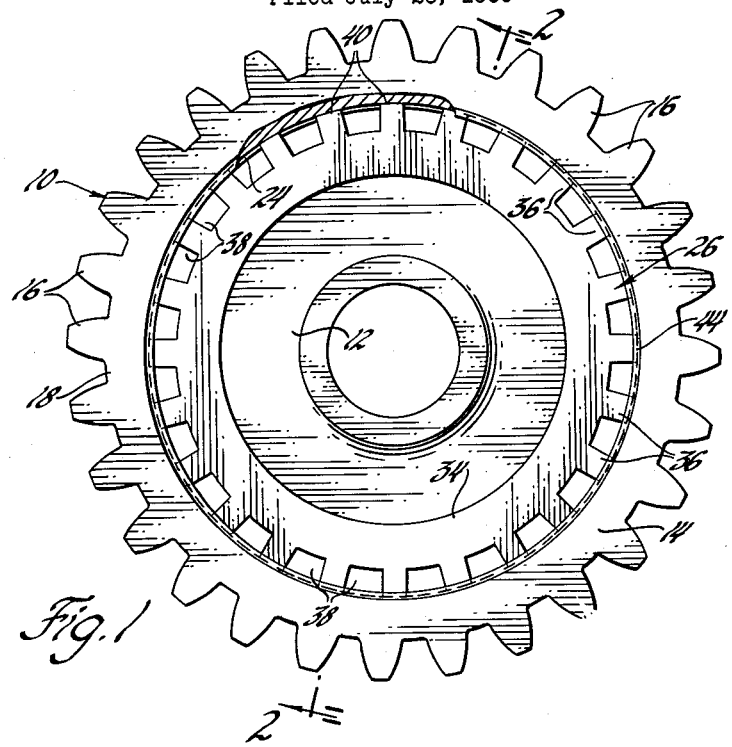

Oct. 9, 1962 M. O. PARR 3,057,220
VIBRATION DAMPING MECHANISM
Filed July 26, 1960

INVENTOR.
Max O. Parr
BY
D. O. McGraw
ATTORNEY

United States Patent Office 3,057,220
Patented Oct. 9, 1962

3,057,220
VIBRATION DAMPING MECHANISM
Max Omer Parr, Indianapolis, Ind., assignor to General Motors Corporation, Detroit, Mich., a corporation of Delaware
Filed July 26, 1960, Ser. No. 45,486
8 Claims. (Cl. 74—443)

The invention relates to a vibration damping assembly comprising a rotatable member such as a gear or wheel which requires vibration damping, and a damping ring for this purpose. It is quite common to use gears or wheels which have a rim or bell section in which vibrations are set up during operation. It has been well known to provide a damping ring in engagement with the inner periphery of the rim in order to counteract these vibrations. In the past such damping rings have been solid and annularly formed so that they appear somewhat like a typical washer. They are usually inserted into a shallow groove formed in the inner periphery of the rim by expanding the rim under heat and contracting the ring. After the ring is installed and the ring and rim reach the same temperature, the ring is held within the groove.

This method of installation is time consuming and does not always result in a satisfactory installation. In some instances the ring is made of a different material from the gear or wheel and at elevated operating temperatures may become loose. The ring also may become accidentally dislodged since the groove in which it is installed must be relatively shallow in order to permit this type of installation.

It has also been suggested that a ring similar to a snap ring be used to permit easier installation. Such rings have not proven entirely satisfactory since their spaced end construction does not provide the requisite vibration damping characteristics. Such rings are also easily dislodged since they may be removed by a simple cantilever type applied force acting against one end.

A vibration damping assembly embodying the invention does not require the heat expansion installation method and at the same time overcomes the objections to the snap ring type damper. The vibration damping mechanism embodying the invention includes a damping ring formed from a plate member and having a circumferentially spaced series of teeth or lugs formed thereon which may be snapped into place by exerting axial pressure on the ring in relation to the gear or other member in which the ring is being installed. The gear may be beveled if desired to provide a cam action for easier installation of the ring. The gear is also provided with an annular groove into which the ring teeth or lugs are snapped in place and which acts to retain the damping ring in position. The outer ends of the teeth tightly engage the bottom of the groove for this purpose. They are also under radial stress so that they act as springs and continually maintain the desired tight engagement. A deeper groove may therefore be used than that required for the heat expansion type of installation, thus more positively retaining the damping ring in position.

Figure 2:
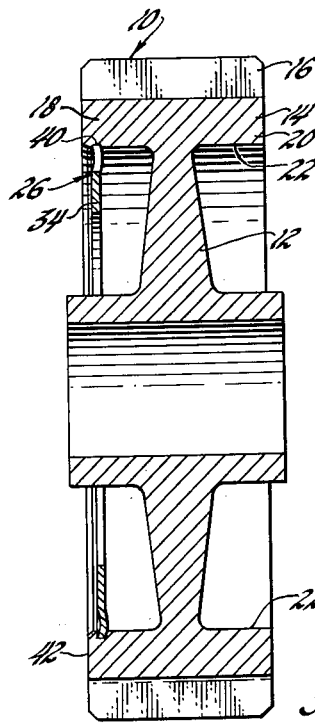
Figure 3:
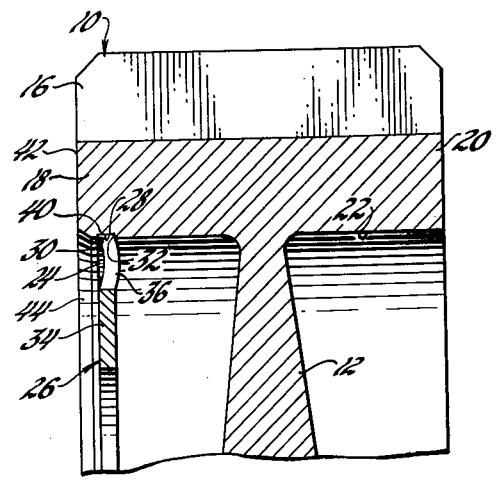

In the drawing:
FIGURE 1 is a side elevation of an assembly embodying the invention and having parts broken away and in section.
FIGURE 2 is a cross section view of the assembly of FIGURE 1 taken in the direction of arrows 2—2 of that FIGURE.
FIGURE 3 is an enlarged view of a portion of the assembly as illustrated in FIGURE 2.

Although the mechanism embodying the invention may be used with gears, wheels or other resonant elements, the invention is illustrated in the drawings as being used with a gear 10 having a web 12 and a rim section 14 on which the gear teeth 16 are formed. The rim 14 of the gear 10 is illustrated as being formed of two flanges 18 and 20 which extend oppositely from the outer circumferential section of web 12. Flange 18, for example, has an annular inner peripheral surface 22 in which an annular groove 24 is formed. The vibration damping ring 26 is received in groove 24. In its normal position ring 26 tightly engages the groove bottom surface 28 and may engage either or both of the groove shoulders 30 and 32.

Ring 26 is formed as an annular plate member having an annular section 34 and a series of circumferentially spaced teeth or lugs 36 defining radially extending recesses 38. Teeth 36 preferably extend outwardly from annular section 34 a sufficient distance to allow the teeth to act as spring members for purposes to be described. The outer ends 40 of teeth 36 lie on a circle having a diameter before installation slightly greater than the diameter of the groove bottom 28. This permits the ring 26 to be tightly engaged with the groove bottom 28 when installed. The recesses 38 also provide numerous passages through which any oil or other fluid which may otherwise be trapped between the ring 26 and the gear 10 may escape.

The end surface 42 of flange 18 may be joined to the flange inner peripheral surface 22 by beveled corner surface 44. The inner diameter of the end surface 42 is preferably greater than the diameter of the circle on which teeth ends 40 lie.

Ring 26 is preferably installed by first placing it so that the outer ends 40 of the teeth 36 engage the beveled surface 44. Axial pressure is then applied against the ring toward the web 12 and the teeth 36 of relatively thin cross section are spring deflected so as to pass over groove shoulder 30 and snap into the groove 24. Since the outer ends of the teeth 36 lie on a diameter somewhat larger than the diameter of groove bottom 28, the teeth 36 continue to be deflected and exert spring forces radially outwardly of the ring 26 and engage the groove bottom 28 tightly. Although it is not necessary, the teeth 36 may also engage either of the shoulders 30 and 32 due to this spring action, or, if dimensions permit, may engage both shoulders. When it is desired to remove the ring it may be pulled outwardly so that it is snapped out of the gear 10 in a manner generally similar to a Belleville spring.

In some instances inner peripheral surface 22 may be frusto conical to taper radially outward toward end surface 42 so that the camming action otherwise provided by beveled corner surface 44 is provided by the tapered inner peripheral surface. The structure may also be provided without beveled corner surface 44 in other instances if the dimensions and material used in ring 26 are such that teeth 36 may be deflected without requiring the camming action.

What is claimed is:
1. In combination, an externally toothed vibration damper ring having an annular section and teeth extending radially outward therefrom, and a resonant member having an annular groove therein receiving said teeth, said ring annular section being entirely in radially inward spaced relation to said resonant member.

2. A vibration damper assembly comprising a resonant member having an annular flange provided with an internal groove and a vibration damper ring having a circumferentially spaced series of external teeth formed to extend radially outward thereon, said ring teeth being radially tightly received in said groove and extending radially inward thereof, said ring damping vibrations in said resonant member.

3. A vibration damping assembly for a gear and the like, said assembly comprising an annular flange on said gear having an inner surface and an end surface, said inner surface having an annular groove formed therein adjacent said end surface, an annular vibration damping plate member positioned radially inward of said groove and having radially extending external teeth formed thereon and received in said groove, said teeth defining springs deflected axially of said plate member and holding said plate member in said groove.

4. A vibration damping assembly for a gear and the like, said assembly comprising an annular flange on said gear having an inner surface and an end surface and beveled corner surface joining said inner surface and said end surface, said inner surface having an annular groove formed therein adjacent said beveled corner surface, an annular vibration damping plate member having an annular section and radially extending external teeth formed thereon and received in said groove, said teeth defining springs deflected axially of said plate member and holding said plate member in said groove and having been snapped into said groove by camming on said beveled corner surface.

5. A vibration damping assembly for a gear and the like, said assembly comprising an annular flange having an inner peripheral surface and an annular end surface, said inner surface having an annular groove formed therein adjacent said end surface and having a bottom diameter greater than the diameter of said inner surface and less than the inner diameter of said end surface, an annular vibration damping plate member having an annular section and radially extending external teeth formed thereon in the plane thereof and received in said groove, the diameter defined by the outer ends of said teeth being in the free position greater than said groove bottom diameter and less than said end surface inner diameter, said teeth defining springs deflected axially of said plate member and holding said plate member in said groove.

6. A vibration damping assembly for a gear and the like, said assembly comprising an annular flange having an inner peripheral surface and an annular end surface and a beveled corner surface joining said inner surface and said end surface, said inner surface having an annular groove formed therein adjacent said beveled corner surface and having a bottom diameter greater than the diameter of said inner surface and less than the inner diameter of said end surface, an anular vibration damping plate member having an annular section and radially extending external teeth formed thereon to extend radially outward in the plane thereof and received in said groove, the diameter defined by the outer ends of said teeth being in the free position greater than said groove bottom diameter and less than said end surface inner diameter, said teeth defining springs deflected axially of said plate member and holding said plate member in said groove and having been snapped into said groove by camming on said beveled corner surface.

7. A vibration damping assembly for a gear and the like, said assembly comprising an annular flange having a cylindrical surface and an annular end surface and a beveled corner surface joining said cylindrical surface and said end surface, said cylindrical surface having an annular groove formed therein adjacent said beveled corner surface and having a bottom diameter being of a dimension between the inner and outer bevel corner surface diameters, an annular vibration damping plate member having an annular section and radially extending teeth of relatively thin cross section formed thereon and in the plane thereof and received in said groove, the diameter defined by the ends of each said teeth in the free position being of a dimension between said groove bottom diameter and end surface inner diameter, said teeth defining springs deflected axially of said plate member and holding said plate member in said groove and having been snapped into said groove by camming on said beveled corner surface.

8. A vibration damper ring adapted to reduce resonate vibration of a resonate member having an annular flange provided with a cylindrical surface and an annular end surface joining said cylindrical surface, an annular groove provided in said cylindrical surface adapted to receive said damper ring, said damper ring comprising an annular section, radially extending spaced teeth formed on said section and in the plane thereof, each said teeth being dimensioned in the free position greater than said groove depth and being of relatively thin cross section, and said teeth defining springs deflected axially of said annular section and holding same in said groove.

References Cited in the file of this patent

UNITED STATES PATENTS

| | | |
|---|---|---|
| 1,434,414 | Stoney | Nov. 7, 1922 |
| 1,666,576 | Lytle | Apr. 17, 1928 |
| 1,804,906 | Wemp | May 12, 1931 |
| 1,813,820 | Ross | July 7, 1931 |
| 2,605,132 | Watter | July 29, 1952 |
| 2,837,923 | Klarman | June 10, 1958 |
| 2,941,631 | Fosberry et al. | June 21, 1960 |

FOREIGN PATENTS

| | | |
|---|---|---|
| 613,314 | France | Aug. 20, 1926 |
| 891,951 | Germany | Oct. 1, 1953 |